Feb. 22, 1949.	H. D. BOGGS ET AL	2,462,462
CONVERTIBLE AIR AND LAND CONVEYANCE
Filed April 7, 1944	3 Sheets-Sheet 2
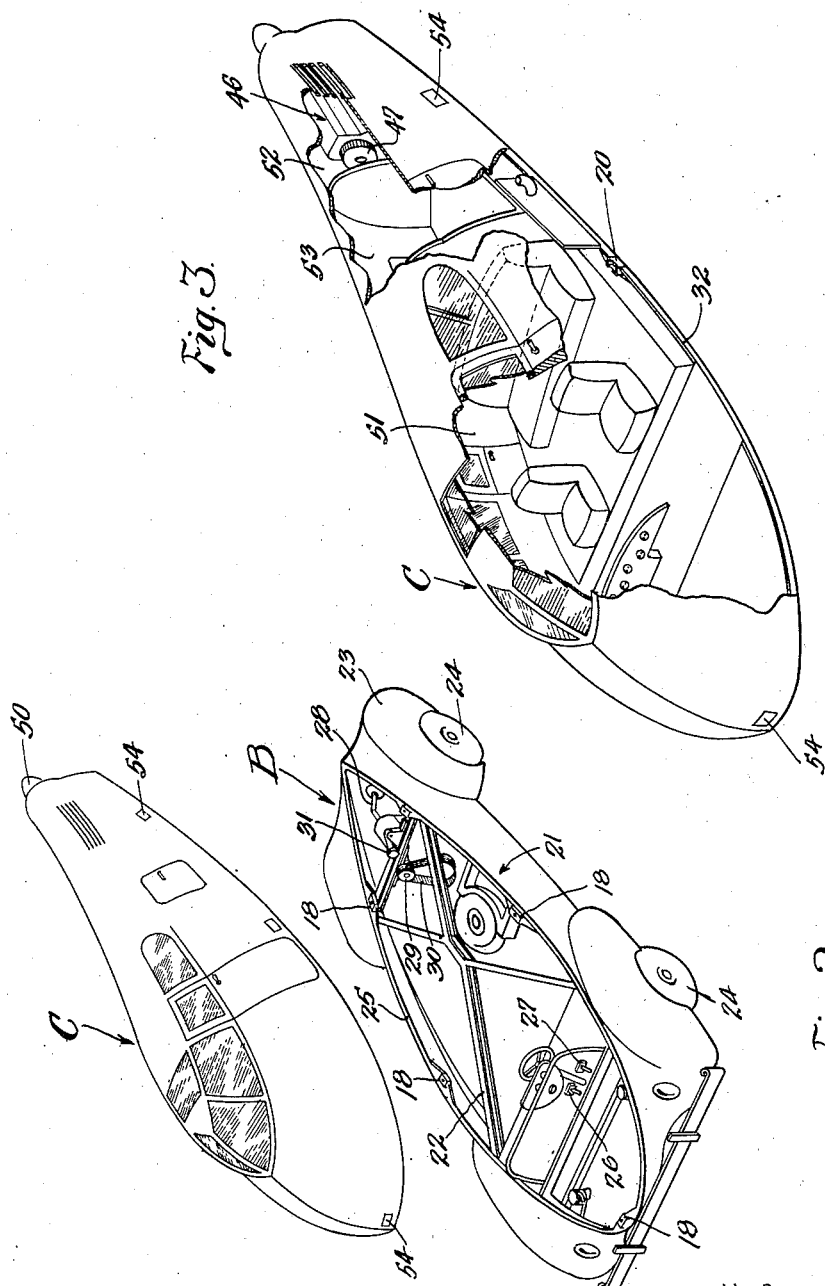
Inventors
Herbert D. Boggs
Helen J. Boggs.
By Wilfred E. Lawson
Attorney Feb. 22, 1949.   H. D. BOGGS ET AL   2,462,462
CONVERTIBLE AIR AND LAND CONVEYANCE Filed April 7, 1944   3 Sheets-Sheet 3

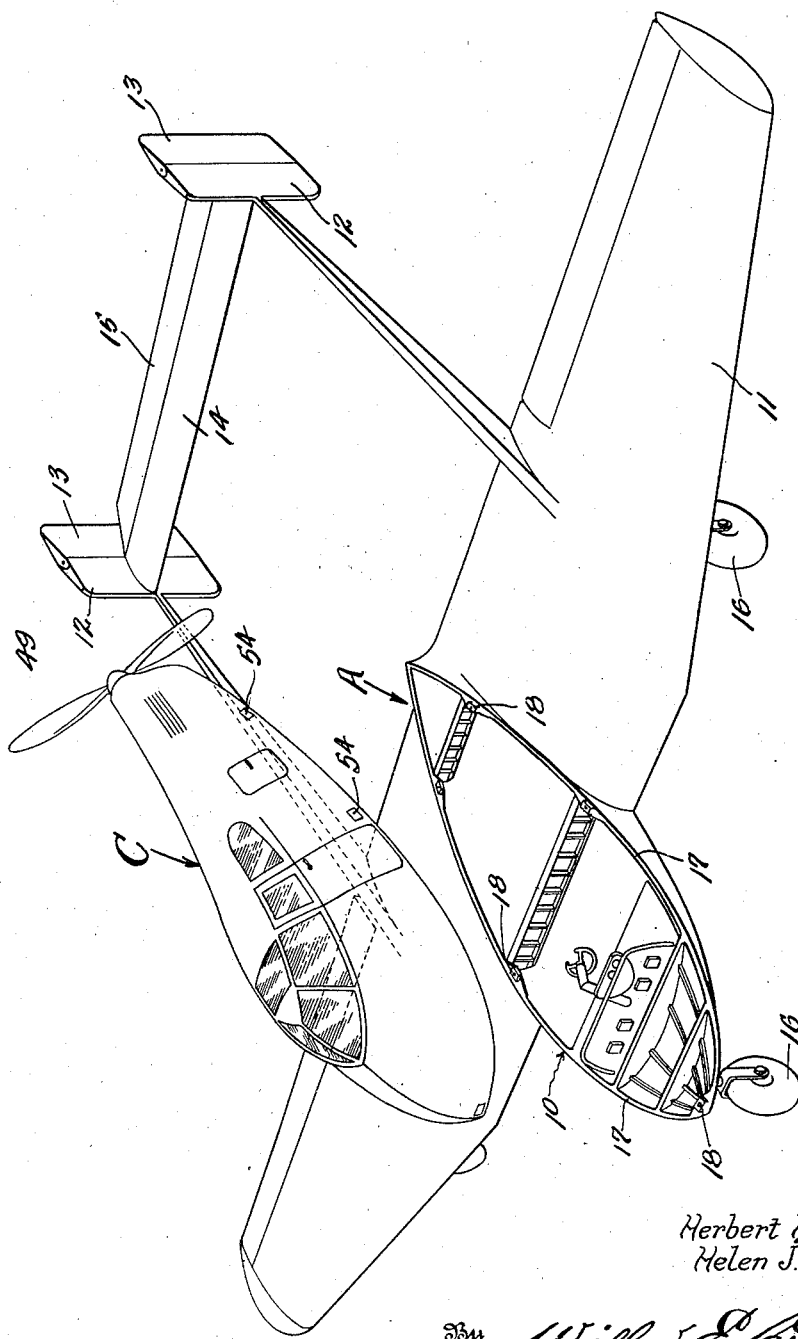

Inventors
Herbert D. Boggs.
Helen J. Boggs.
By Wilfred E. Lawson
Attorney

Patented Feb. 22, 1949

2,462,462

UNITED STATES PATENT OFFICE 2,462,462

CONVERTIBLE AIR AND LAND CONVEYANCE

Herbert D. Boggs and Helen J. Boggs,
Omaha, Nebr.

Application April 7, 1944, Serial No. 529,998

8 Claims. (Cl. 244—2)

This invention relates generally to the class of vehicles and is directed particularly to vehicles or conveyances designed for either air or land operation.

The principal object of the present invention is to provide a conveyance for air or land travel wherein the body or fuselage in which the passengers are transported, forms a unit which is common to either an air vehicle chassis or a land vehicle chassis.

Another object of the invention is to provide in a conveyance of the character stated, wherein the body or fuselage and the two chassis with which it is designed to be selectively used, are designed to fit accurately together whereby the fuselage when assembled fits either the air vehicle chassis or the land vehicle chassis, and forms a complete, symmetrical vehicular structure for general use and adapted to be handled in the same way as an integrally fabricated structure.

Another object of the invention is to provide in a conveyance of the character stated, a construction or design which facilitates the transference of the body or fuselage from one type of chassis to the other, easily and quickly, with means for locking the parts together so that all possibility of shifting or relative movement of the parts is completely avoided.

More specifically the invention contemplates the provision of an air vehicle or an airplane chassis having a fuselage portion with which are connected the controls, landing gear and all other parts common to an airplane. As a counterpart of the air vehicle chassis, there is provided a land vehicle chassis comprising the lower portion of an automobile body having as a part thereof all of the usual running gear, steering mechanism, power transmitting differential and other parts common to a motor vehicle. Common to these two separate and independent chassis units is a body or fuselage unit designed for attachment to and to complete the lower body portion of either the air vehicle chassis or the land vehicle chassis and readily shiftable or changeable from one to the other, such fuselage unit including generally a power plant or motor, passenger seats, and all other equipment which is common to both the airplane and the automobile, such fuselage unit being designed to have an air screw operatively coupled with the power plant and also designed to have the power plant operatively coupled with the power transmitting differential of the motor vehicle when the fuselage forms a part of the land vehicle structure.

The invention will be best understood from a consideration of the following detailed description taken in association with the accompanying drawings forming a part of the specification, with the understanding, however, that minor changes and modifications may be made in the invention so long as such changes or modifications mark no material departure from the salient features of the invention as expressed in the appended claims.

In the drawings:

Figure 1 is a view in perspective of the air vehicle chassis and the body or fuselage thereabove and in position to be mounted thereon for the completion of the conveyance as an airplane.

Figure 2 is a view in perspective of the land vehicle chassis with the body unit or fuselage in position thereabove to be placed or mounted thereon for completion of the conveyance as an automobile.

Figure 3 is a view in perspective with parts broken away, of the body or fuselage unit per se, the same being shown on an enlarged scale.

Figure 4:
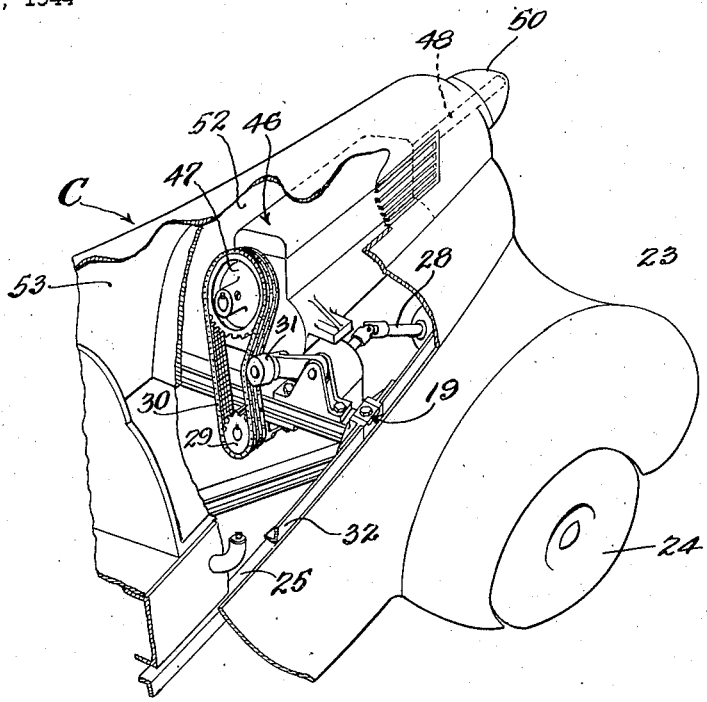
Figure 4 is a view in perspective of the rear end of the conveyance complete as a motor vehicle or automobile, parts being broken away to show the established driving connection between the power plant and the chassis carried mechanism for transmitting driving power to the ground engaging wheels.
Figure 5:
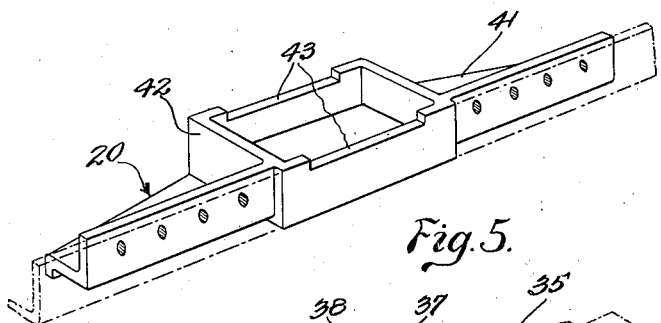
Figure 5 is a view in perspective of the upper part or body carried part of a coupling between the body and a chassis.
Figure 7:
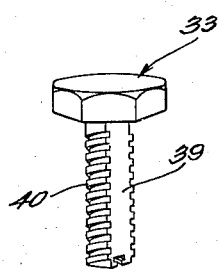
Figure 7 is a view in perspective of the locking bolt used with the coupling.
Figure 6:
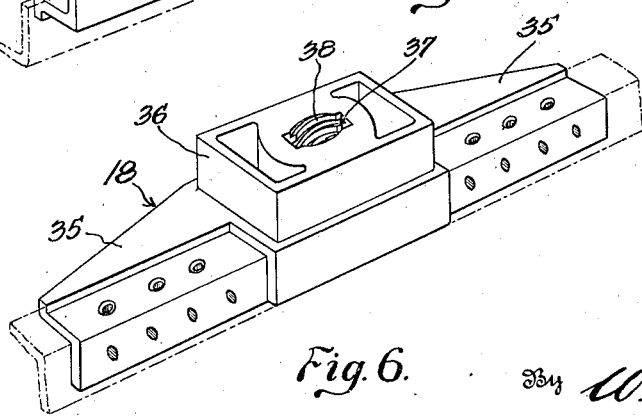
Figure 6 is a view in perspective of the lower part of such coupling.
Figure 8:
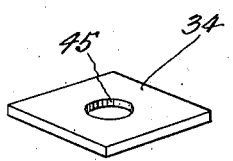
Figure 8 is a view in perspective of the locking plate used with the coupling.

Referring now more particularly to the drawings it will be seen that the invention comprises three separate and distinct units namely, unit A, Figure 1, which will be termed the air vehicle chassis; unit B, Figure 2, which will be termed the land vehicle chassis, and unit C, which is common to and interchangeable with units A and B and which will be defined or referred as the body or fuselage.

As previously set forth the invention is directed to the idea of providing the three units defined by which the complete air vehicle or airplane can be obtained upon mounting unit C upon unit A or, if land travel is desired a complete land vehicle or automobile may be obtained by mounting or transferring the same unit C from the unit A onto the unit B.

In accordance with the present invention the unit A or air vehicle chassis will comprise a lower body portion or hull 10 with which will be integrally connected the airfoils 11, the usual vertical fins 12 and vertical rudders 13, stabilizer 14 and horizontal rudder 15. Any type of wing or airfoil and rudder or tail and construction may be employed, therefore it is to be understood that the invention is not limited to the specific design or arrangement of these parts, which are illustrated.

The air vehicle chassis also has connected therewith necessary landing gear such as the wheels 16.

The hull portion 10 which forms the lower part or bottom of the fuselage body C has a wall rim 17 of the necessary contour to fit a corresponding wall rim, hereinafter described, forming a part of the body or fuselage C, and this rim carries upon its said top and at spaced intervals therearound the lower or bottom half 18 of a locking unit which is designated in Figure 4 by the reference character 19. The upper half of this locking unit is designated 20 and is carried by the removable unit or body C.

The hull portion or lower half of the fuselage of the air vehicle chassis also carries those controls, instruments and other parts which belong only to an airplane or other air vehicles. Since such parts are well known and their association with the structure forms no part of the present invention no detailed description or illustration of the same or their location in the structure is believed necessary.

The land vehicle chassis B comprises the lower or body portion 21 which corresponds to the hull 10 and which, when the body or fuselage C is fitted thereto, forms the lower half of such fuselage. This fuselage lower section or half includes the usual motor vehicle chassis frame 22, the vehicle wheel fenders 23, supporting wheels 24 and the necessary running gear associated with the supporting wheels, which is not here illustrated but which forms the usual parts of a standard automobile.

The lower part of the body portion 21 has the top edge or rim 25 which is of the same contour as the rim 17 so as to fit the lower edge or rim portion of the fuselage body unit C when the latter is lowered into position upon the vehicle chassis unit B. This flange or rim 25 is also provided at the same spaced intervals as the units A and C, with the lower halves 18 of the locking or coupling device 19.

The land vehicle chassis unit B also carries all of those parts which would be found only in an automobile, such as the brake and clutch pedals 26 and 27 respectively and other parts which are not illustrated.

The land vehicle chassis is provided at the rear with the power shaft 28 with which is illustrated a means for establishing an operative or driving connection with the power plant which is carried in the removable body or fuselage unit C. Such means is here illustrated as comprising a chain or sprocket gear 29, carried by the shaft 28 and a driving chain 30.

Suitable means is provided for maintaining the driving chains 30 at the proper degree of tautness when it is operatively connected with the power plant, such means being illustrated as a pivotally supported idler roller 31 which bears against one side or one run of the chain when the latter is in use.

The body or fuselage unit C is adapted to be placed upon either the air vehicle chassis or the land vehicle chassis to be secured thereto and to this end such body comprises an outlining frame or plate rail 32 which is of the same configuration as the outlining flanges 17 and 25 of the units A and B. This plate rail has secured thereto the upper halves 20 of the coupling or locking units 19. Such halves of the units are, of course, spaced apart the same as the lower halves 18 which are secured to the units A and B so that when the body or fuselage is placed upon one of the last mentioned units, the halves of the several couplings which are arranged at the spaced intervals between the contacting portions of the structure, will fit together so as to become interlocked one with the other and may then be secured against separation so as to fully retain the two parts of the structure together.

Each of the couplings comprises, as shown in Figures 5 to 8 inclusive, the upper and lower portions 20 and 18 respectively, a securing or locking nut 33 and a locking plate 34.

The lower half of the coupling comprises an elongated plate 35 which is formed in a suitable manner to have the sill frame 17 or 25 of the units A and B, riveted or otherwise coupled thereto. At the center of this plate there is formed the rectangular post 36 which stands above the plane of the supporting sill and which is centrally formed with the bolt hole 37 in which are formed broken threads 38. By this arrangement of the threads 38 in the bolt hole, opposite portions of the wall of the hole are unthreaded for coaction with similarly unthreaded portions or sides 39 of the bolt 33 which has the broken thread 40 for coaction with the thread 38.

The upper portion or half of the coupling is in the form of a relatively long plate 41 which is likewise suitably formed to be connected into the plate rail 32 of the body or fuselage unit C. This plate 41 at its central part is formed to provide the rectangular collar 42 which is constructed to snugly receive the post 36.

The top edges of opposite sides of the collar 42 are cut away as indicated at 43 to receive the locking plate 34 through the central opening at 45 of which the lock bolt 33 passes.

The fuselage body C carries the power plant which is generally designated 46 and which is here shown as being mounted in the rear end of the body so that when the body is in position upon the land vehicle chassis 28 the engine or power unit will lie directly over the power transmission shaft 28 so that the driving chain 30 can be coupled with the driving sprocket wheel 47 which is connected directly with the crank shaft of the engine.

At the opposite end of the engine from the power drive wheel 47, the crank shaft is extended to provide a driving shaft 48 for an air screw or propeller 49 which is mounted upon the shaft 48 when the fuselage body is mounted on the air vehicle chassis, whereby the desired driving power for the air vehicle is obtained.

While the power plant and propeller have been illustrated at the rear end of the fuselage body it is to be understood that these parts may be placed in the front end of this body so that the air vehicle may be operated as a tractor type instead of a pusher type. It will be understood, of course, that in such construction the necessary changes will be made in connection with the driving shaft 28 to facilitate transmitting the power from the front end of the vehicle to the rear wheels or, if desired, driving connection may be made with the front wheels or with both the front and rear wheels to provide either a front end drive or a four wheel drive for the land vehicle.

When the body or fuselage unit C is mounted upon the land vehicle chassis the air screw 49 will be removed and the end of the propeller shaft may be covered by a suitable cap 50, Figure 4. In a fuselage body construction as illustrated particularly in Figure 3 there is shown a main compartment 51 provided with seats for passengers and for the vehicle operator or driver while behind this compartment and between the same and the compartment 52 in which the power plant is housed, is the intermediate compartment 53 which may be used for baggage or other material. It will be understood, that the fuselage unit C will also carry other necessary equipment and instruments which may be common to an airplane and a motor vehicle. Such instruments and equipment are not illustrated since they form no part of the present invention and are standard as will be readily recognized.

The parts 20 of the coupling are disposed inside the wall of the unit C so that these parts and the couplings as a whole will be entirely hidden when this unit is mounted upon and secured to either the unit A or the unit B. In order to facilitate the reaching of the couplings for placing and removing the locking bolts 33 of each, the wall of the unit C is provided, adjacent each coupling, with a suitable door 54 which gives access to the adjacent coupling unit.

From the foregoing it will readily be seen that conversion of the passenger carrying unit C from a land vehicle conveyance to an air borne conveyance or vice versa, can be easily and quickly accomplished and through this arrangement it is possible to eliminate unnecessary "dead" weight, such as parts peculiar to the automobile, when the combination is made up as an airplane and on the other hand when the combination is made up and assembled as an automobile, parts are not being transported which are peculiar to the airplane and not to the automobile.

It is believed that the operation of the coupling will be readily apparent. It will be seen that by the provision of the partially threaded locking bolt which is extended through the locking plate 34 supported upon the upper half 20 of the coupling, into the bolt hole 37, wherein mutilated threads are formed, the bolt can be dropped directly into the bolt hole with the unthreaded spaces 39 opposing the threaded portions 38 of the bolt hole and then given a quarter turn to effect the prompt locking of the bolt in the hole through the engagement of the bolt thread with the hole thread.

In the use of the present invention it is proposed that the conveyance or "airplane-car" should be manufactured jointly by aircraft and automotive companies. The sales distribution as set up by the automotive companies might be utilized as an outlet for the product by making each automotive dealer a distributor for the conveyance. The car fuselage body or unit C could very easily be displayed in showrooms and, in fact, it would be possible also to display all three units in this manner. The automobile component or unit would, of course, be housed in the family garage, whereas the flying surface component or unit would be stored at the nearest airport. The automobile dealers would find an opportunity to operate a conversion service at the airport and in addition would find the opportunity for active business in renting chassis to in-transit airplane-car flyers.

Business men and business firms who would find the airplane-car a medium of travel to cover wide territories, could purchase just the two units A and C and depend entirely upon rental service for ground travel at various points of call by the use of the unit B with the unit C.

We claim:

1. A conveyance means for land and air travel, comprising two independently usable incomplete traveling units, one designed for travel in the air and the other designed for travel on land, a passenger housing unit designed for connection with either of the incomplete units to form a complete unit, and a single power plant common to the completed traveling units.

2. A conveyance means for land and air travel, comprising two independently usable incomplete traveling units, one designed for travel in the air and the other designed for travel on land, a passenger housing unit common to the two units and adapted to be secured to and to complete either unit for travel, a power plant in the passenger housing unit, means for mounting an air screw on the housing unit and for driving the screw from the power plant, and means for driving the said other unit from the power plant.

3. A conveyance means of the character stated, comprising a winged structure forming an incomplete flying unit, a wheeled structure forming an incomplete land vehicle unit, a body unit adapted to be mounted on either of the first units to complete the same, a power plant carried by the body unit, and plural means for selective connection with the power plant for driving the completed units.

4. A conveyance means of the character stated, comprising a winged structure forming an incomplete flying unit and including a hull or lower body portion, a wheeled structure forming an incomplete land vehicle unit and including a hull or lower body portion, a body unit formed to fit upon either of said lower body portions, coupling units having coacting parts carried by the body unit and the lower body portions for securing the body unit and said lower body portions together, a power plant carried by the body unit, and means connected with and operated by the power plant for driving the completed units.

5. A conveyance means as set forth in claim 4, in which the incomplete flying unit carries instruments and parts peculiar to flying machines alone, the incomplete land vehicle unit carries instruments and parts peculiar to an automobile alone, and the body unit carries instruments and parts common to both a flying machine and an automobile.

6. A conveyance means of the character stated, comprising a winged structure forming an incomplete flying unit and including a lower body portion having a sill, a wheeled structure forming an incomplete land vehicle unit and including a lower body portion having a sill, a fuselage or body unit having a bottom plate of the same contour as said sills and adapted to rest thereon whereby the body unit may be combined with either of said lower body portions for the formation of a complete unit, coupling means for securing said plate to the supporting sill, each coupling means including a post, a collar for receiving the post and a bolt for securing the collar and post together, a power plant carried by the body unit, means for connecting an air screw with the power unit for the operation of the completed flying unit, and means for establishing a driving connection between the power plant and the land vehicle unit for driving the completed land vehicle unit.

7. A conveyance means of the character stated, comprising a winged structure forming an incomplete flying unit and including a lower body portion having a sill, a plurality of posts carried by and extending upwardly from said sill, a wheeled structure forming an incomplete land vehicle unit and including a lower body portion having a sill, a plurality of posts carried by and extending upwardly from said sill, a fuselage unit having a bottom wall plate of the same contour as and adapted to position upon the sill of either of said structures to complete the same, a plurality of means carried by said plate for receiving the posts of the sill upon which the plate rests, means for securing the posts and the receiving means therefor together, a power plant carried by the body unit, and means operated by the power plant for driving the structure completed by the fuselage unit.

8. A conveyance means as set forth in claim 7, in which the winged structure carries those parts which are found in airships only and in which the wheeled structure carries those parts which are found in a motor vehicle only, and in which the fuselage carries those parts which are common to an airship and a motor vehicle.

HERBERT D. BOGGS.
HELEN J. BOGGS.

REFERENCES CITED

The following references are of record in the file of this patent:

UNITED STATES PATENTS

| Number | Name | Date |
|---|---|---|
| 1,992,941 | Fowler | Mar. 5, 1935 |
| 2,215,003 | Johnson | Sept. 17, 1940 |
| 2,387,527 | Nagamatsu | Oct. 23, 1945 |